United States Patent
Southwell et al.

(10) Patent No.: US 7,062,634 B1
(45) Date of Patent: Jun. 13, 2006

(54) PROCESSOR AND A METHOD FOR HANDLING AND ENCODING NO-OPERATION INSTRUCTIONS

(75) Inventors: Trefor Southwell, Bristol (GB); Peter Hedinger, Bristol (GB)

(73) Assignee: STMicroelectronics Limited, Almondsbury (GB)

( * ) Notice: Subject to any disclaimer, the term of this patent is extended or adjusted under 35 U.S.C. 154(b) by 439 days.

(21) Appl. No.: 10/060,070

(22) Filed: Jan. 29, 2002

(51) Int. Cl.
*G06F 15/00* (2006.01)

(52) U.S. Cl. .......................... 712/24; 712/210
(58) Field of Classification Search ................ 712/24, 712/210
See application file for complete search history.

(56) References Cited

U.S. PATENT DOCUMENTS 5,819,058 A * 10/1998 Miller et al. ................. 712/210
5,922,065 A *  7/1999 Hull et al. ..................... 712/24
5,970,241 A * 10/1999 Deao et al. .................. 712/227
6,044,450 A *  3/2000 Tsushima et al. ............. 712/24

OTHER PUBLICATIONS

Hennessy and Patterson. Computer Organization and Design, 2nd ed. Morgan Kaufmann Publishers, 1998. p. 478.*

* cited by examiner

*Primary Examiner*—Eddie Chan
*Assistant Examiner*—Kevin P. Rizzuto
(74) *Attorney, Agent, or Firm*—Lisa K. Jorgenson; Timothy L. Boller; Seed IP Law Group PLLC

(57) ABSTRACT

A processor is described in which the need to encode no-operation instructions (nops) in the program is minimised by providing a device for generating nops in response to information encoded in operative instructions.

26 Claims, 3 Drawing Sheets

PROCESSOR AND A METHOD FOR HANDLING AND ENCODING NO-OPERATION INSTRUCTIONS

FIELD OF THE INVENTION

The present invention relates to a processor and a method for handling no-operation instructions, and also to a computer program product.

BACKGROUND TO THE INVENTION

As is well known, a processor executes a stream of instructions which can perform many different operations. A nop (no-operation) is an instruction that does nothing, that is it has no effect on any state of the processor.

On a traditional superscalar CPU, the nop instruction is used to pad out code (for alignment issues) or to provide a single cycle delay for timing critical operations. So-called VLIW (very long instruction word) machines operate by encoding a plurality of instructions in a single word. The machines are most effective when all instructions in a word can be processed in parallel in a single clock cycle. However, it is often not possible to write code in a suitable way to achieve this. Take a simple example, where a multiply instruction might take three cycles to complete, which means that there will be at least two clock cycles after the multiply instruction has been issued where the result of the multiply instruction is unavailable. During this time it is expected that other instructions will be executed which do not rely on the result of the multiply instruction being available. However, in some cases there is no other useful work to perform while waiting for the multiply instruction to be completed. In such an event, a nop instruction is used to provide a delay until the result of the multiply instruction becomes available. Instructions of different types can have different latencies (cycle time to completion), which can lead to a much higher proportion of nop instructions than in traditional processors.

One undesirable side effect of an increased number of nop instructions is an increase in the size of the program, as compared to the program which would be used by a traditional CPU. Conventionally each nop instruction has a bit length equivalent to that of an operative instruction. Larger programs can be undesirable as they take up more space in memory. Also, as most processors fetch their program via a cache system, an increase in program size can also result in an increase in the number of cache misses. Cache misses take up execution time and bus bandwidth and therefore the additional nop instructions can slow down the program or otherwise have an adverse effect on the system.

It is an aim of the present invention to deal with no-operation instructions in a manner which does not undesirably increase the size of the program.

SUMMARY OF THE INVENTION

According to one aspect of the invention there is provided a processor for executing instructions comprising: an instruction decode stage and an execution stage, the instruction decode stage comprising means for generating no-operation instructions and supplying said no-operation instructions to the execution stage, the number of no-operation instructions to be generated being encoded in an operative instruction received at the instruction decode stage.

Another aspect of the invention provides a method of supplying instructions to an execution stage of a processor wherein at least some of said operative instructions to be executed by the execution stage each encode a number of no-operation instructions to be executed subsequent to that operative instruction, wherein the method comprises; decoding each operative instruction, determining whether or not no-operation instructions are to be executed after said operative instruction and, where it is determined that a number of non-operative instructions are to be executed, generating said number of non-operative instructions and supplying said no-operation instructions to the execution stage.

A further aspect of the invention provides a computer program product comprising: program code means having a sequence of instructions to be executed by a processor, said sequence of instructions including at least some operative instructions which encode a number of no-operation instructions to be executed such that when the program code means is loaded into a suitable processors a number of no-operation instructions corresponding to that encoded in the operative instruction is generated and executed after the operative instruction has been executed.

As will be clear, the code size can be significantly reduced by utilising the invention by eliminating the need to include no-operation instructions where the number of such instructions to be executed can be encoded in a preceding operative instruction. It will be appreciated that it may not be possible to remove all no-operation instructions from the code, and therefore the facility remains to include some "conventional" no-operation instructions in addition to the newly encoded operative instructions. Nevertheless the reduction in the number of no-operation instructions included in the code can be significant depending on the encoding scheme which is utilised as discussed in more detail in the following.

For a better understanding of the present invention and to show how the same may be carried into effect, reference will now be made by way of example to the accompanying drawings.

DESCRIPTION OF THE PREFERRED EMBODIMENT

Figure 1:
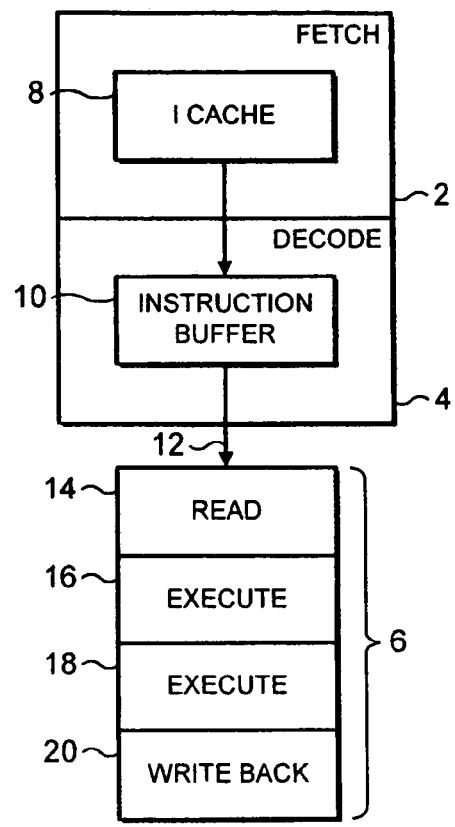
FIG. 1 is a schematic diagram of a known processor architecture.

FIG. 1 is a schematic diagram of an existing processor arrangement. It will be clear that many of the essential elements to implement a processor are not illustrated in FIG. 1 because they are not germane to the present invention and are well known to a person skilled in the art. In particular, FIG. 1 does not show the instruction memory, the data memory or the register file associated with the fetch, decode and execution components which are shown in FIG. 1. Thus, FIG. 1 illustrates a fetch stage 2, a decode stage 4 and an execution pipeline stage 6. The fetch stage 2 is shown to incorporate an instruction cache 8 to illustrate the fact that instructions are fetched from main memory into an instruction cache prior to dispatch to the decode stage. Instructions are held in main memory in the form of very long instruction words (VLIWS) each word having a number of instructions, for example four 82 bit instructions. Instructions are fetched from the main memory in the form of cache lines, each cache line for example being 64 bytes long and containing sixteen instructions. In each fetch cycle, instructions are supplied from the fetch stage 2 to the decode stage 4 which includes an instruction buffer 10. The instruction buffer 10 fetches four instructions at a time and determines by examining a stop bit (discussed later) how many of these instructions can be executed in parallel. It will be appreciated that the pipeline stage 6 can be implemented in a number of different ways but in any event is capable of executing more than one instruction in parallel in the same cycle. Instructions which can be executed in parallel are referred to herein as a "bundle" and the bundle of instructions is supplied from the decode stage 4 to the execution pipeline 6 along the instruction path 12. The instruction pipeline which is illustrated has a read stage 14, a first execute stage 16, a second execute stage 18 and a write back stage 20. Instructions are organised in the instruction buffer 10 to take into account the facilities available in the execution pipeline stage 6 to provide instructions which can be executed in parallel. In the terminology used herein, each of the instructions within a bundle is called a "syllable".

Figure 5:
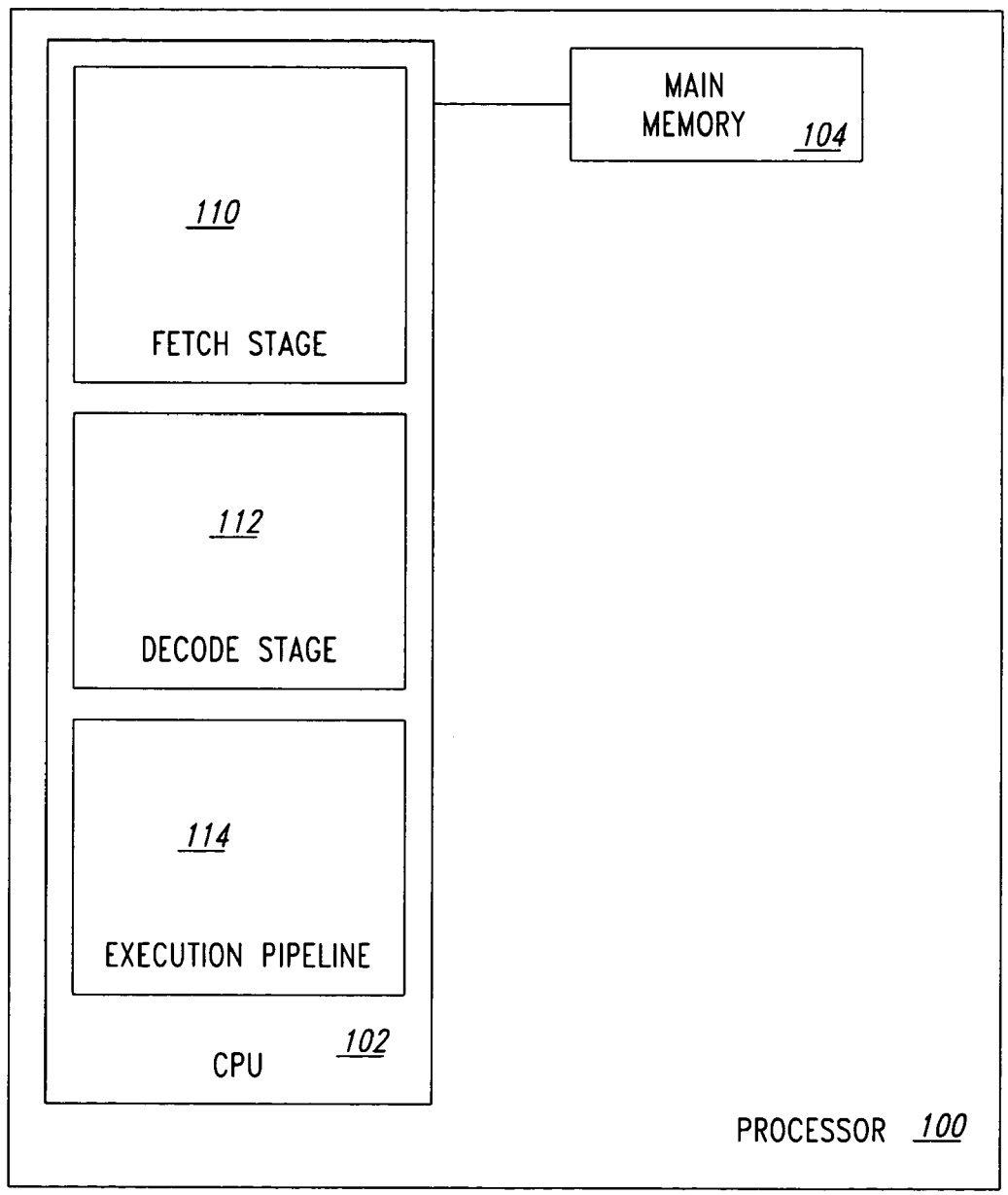
FIG. 5 is a functional block diagram of a known processor architecture.

FIG. 5 is a functional block diagram of a known processor architecture. The processor 100 has a CPU 102 coupled to a main memory 104. The CPU 102 comprises a fetch stage 110, a decode stage 112, and an execution pipeline 114.

Instructions which do not have any result on the processor state are referred to as no-operation or nop instructions. The effect of nop instructions on the sequence of execution of instructions is illustrated diagrammatically in FIG. 2 in relation to the following sample set of instructions. In the following sample set, the double semi-colon denotes a stop bit which is set on the last syllable in each bundle of instructions to be executed in parallel.

```
Mul r1 = r2, r3      <= Stop bit is set to 0
Add r2 = r2, r3      <= Stop bit is set to 0
Add r3 = r3, r4;;    <= Stop bit is set to 1
Nop;;                <= Stop bit is set to 1
Nop;;                <= Stop bit is set to 1
Add r1 = r1, r5;;    <= Stop bit is set to 1
```

Figure 2:
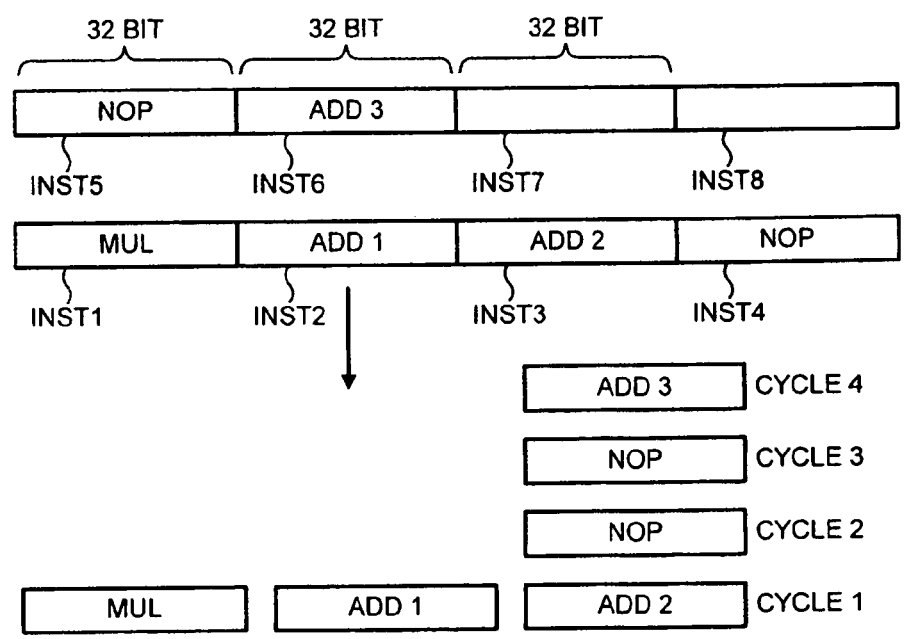
FIG. 2 is a schematic diagram illustrating instruction bundlings.

Thus, the instructions are fetched into the decode stage in groups of four as illustrated in FIG. 2, that is with instruction 1, instruction 2, instruction 3 and instruction 4 in a first group and instructions 5 to 8 in a second group.

At the decode stage 4, the instruction buffer organises the instruction to supply the MUL and ADD) instructions Inst1, Inst2 and Inst3 as a single bundle in cycle 1 to the execution pipeline stage 6. The flop instruction Inst4 is then supplied in cycle 2, followed by the next nop instruction Inst5 in cycle 3. Finally, on the fourth cycle, the single instruction Inst6 is supplied to the execution pipeline stage 6. In FIG. 2, the nop instructions Inst4 and Inst5 are encoded as 32 bit instructions which are held in the instruction memory forming part of the VLIW. The number of nops stored in any particular code sequence can be significant. A sample section of code for a VLIW processor manufactured by STMicroelectronics and known as the ST210 was profiled in order to determine the number of nops and the results given in the following table, Table 1. Clearly, a lot of memory space is utilised in storing nops, and many cache fetches are used up for operations which do nothing, or have no perceived effect on the state of processor system. The manner of dealing with nop instructions discussed in the following is designed to overcome this difficulty.

TABLE 1

| Number of nops in a row | Occurences | Total nops | Percentage of flops |
|---|---|---|---|
| 1 | 638 | 638 | 46% |
| 2 | 278 | 556 | 40% |
| 3 | 64 | 192 | 14% |
| 4 | 0 | 0 | 0% |
| 5+ | 0 | 0 | 0% |
| Total | | 1386 | 100% |

Figure 3:
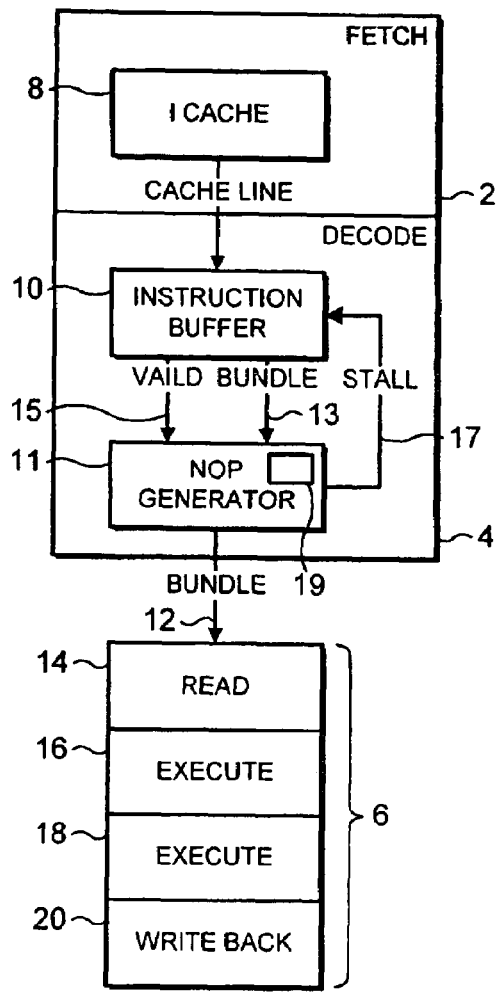
FIG. 3 is a schematic diagram of a new processor architecture for generating no-operation instructions.

According to the described embodiment of the invention, nops are no longer all encoded as separate individual instructions forming part of the code set, but are generated by the processor itself. The generation of nops is dependent on the encoding of one or more field of an existing valid and normally executable instruction. FIG. 3 is a schematic diagram of revised processor architecture for implementing the invention. In FIG. 3 like numerals denote like parts as in FIG. 1. The processor of FIG. 3 differs from that in FIG. 1 by the provision of a nop generator 11 connected to receive instructions and control signals from the instruction buffer 10. A bundle of instructions is received from the instruction buffer 10 along instruction path 13. The instruction buffer 10 supplies a valid control signal along line 15 and receives a stall signal from the nop generator along line 17. The instruction buffer 10 of FIG. 3 differs from the instruction buffer 10 of FIG. 1 in its ability to read particular instruction fields to determine whether or not a nop is to be generated. This is discussed in more detail below but before looking at the precise instruction encoding a brief description of operation of the processor of FIG. 3 will be given. The instruction cache 8 delivers cache lines to the instruction buffer 10. The instruction buffer 10 assembles bundles of instructions and supplies them to the nop generator 11. If the valid signal on fine 15 is false, the nop generator 11 dispatches a nop instruction along path 12 to the execution pipeline stage 6. If however the valid signal on line 15 is true then the bundle of instructions generated by the instruction buffer on line 13 is passed by the nops generator 11 to the execution pipeline stage 6 along path 12.

In addition, each time a nop instruction is generated by the nop generator 11 and supplied to the execution pipeline stage 6 the instruction buffer is stalled by way of a command along stall line 17 to hold up the supply of the next bundle of instructions. The nop generator 11 includes a nop counter 19 which holds a count of the number of nops to be generated (dependent on the instruction encoding as discussed in more detail below) and decrements the count each time a nop has been output to the pipeline stage 6.

Figure 4:
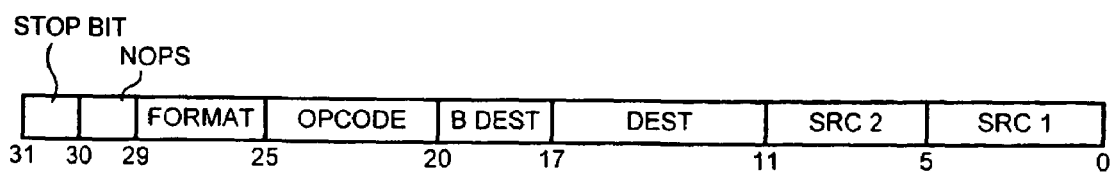
FIG. 4 is a diagram of an instruction format in which the number of no-operation instructions to be generated is encoded.

FIG. 4 illustrates an encoding format for a 32 bit instruction. In the instruction format of FIG. 4:

bits 0 to 5 identify a first source register Src1,
bits 6 to 11 identify a second source register Src2,
bits 12 to 17 identify a destination register Dest,
bits 18 to 20 identify a branch destination,
bits 21 to 25 define the opcode for the instruction,
bits 26 to 29 define the type of the instruction,
bit 30 is the novel nop bit to be discussed in more detail later, and bit 31 is the stop bit, also discussed later.

The stop bit is set by the assembler if the syllable is the last in the bundle. This defines in each case the end of the group of instructions which can be executed in parallel.

The nop bit field allows a nop bit to be set such that a single nop instruction is generated by the nop generator 11. If the bit is not set, no nops are generated. Such an arrangement allows single no-operation instructions to be generated following the instruction in which the nop bit 30 is set. This is a significant improvement because it substantially reduces the number of nops that have to be encoded as full instructions in the code. However, it is clearly advantageous to have more than one bit in the nop bit field so that a plurality of nops can be generated by the nop generator depending on the number of bits set in a multiple field. Where the instruction encoding format allows, a multiple nop field can be provided.

In the present case, it is possible to take advantage of the semantics of the stop bit in the following way. It only makes sense to encode nops in one of the syllables in a bundle. By always encoding the nops in the last syllable of each bundle, the stop bit is always set when nops are encoded in a syllable. Thus it is possible to use a 1 bit nop bit field together with the stop bit to allow up to two nops to be encoded as indicated in Table 2 below,

TABLE 2

| Stop bit | Nop bit-field | Meaning |
| --- | --- | --- |
| 0 | 0 | There are further syllables in this bundle. |
| 1 | 0 | This is the last syllable in the bundle and no nops will follow. |
| 0 | 1 | This is the last syllable in the bundle and 1 nop will follow. |
| 1 | 1 | This is the last syllable in the bundle and 2 nops will follow. |

As mentioned above, the number of bits which are free for encoding nops affects the number of nops which can bb encoded in a single syllable, and therefore the number of nops which it is possible to remove as fully encoded instructions from the code. For the code sample exemplified in Table 1, the following table, Table 3, denotes the effect of the increase in number of bits used to encode nops (the extreme left hand column) on the percentage of nops which can be removed from the sample code (the extreme right hand column).

TABLE 3

| Bits | Number of nops in a row | Number of nops after compression | Nops removed from sample code | Total Nops removed from sample code | Total nops Removed From sample Code percentage |
| --- | --- | --- | --- | --- | --- |
| 1 | 1 | 0 | 638 | 1044 | 75% |
|   | 2 | 1 | 278 |   |   |
|   | 3 | 1 | 128 |   |   |
|   | 4 | 2 | 0 |   |   |
|   | 5 | 2 | 0 |   |   |
| 2 | 1 | 0 | 638 | 1386 | 100% |
|   | 2 | 0 | 556 |   |   |
|   | 3 | 0 | 192 |   |   |
|   | 4 | 1 | 0 |   |   |
|   | 5 | 1 | 0 |   |   |

TABLE 3-continued

| Bits | Number of nops in a row | Number of nops after compression | Nops removed from sample code | Total Nops removed from sample code | Total nops Removed From sample Code percentage |
| --- | --- | --- | --- | --- | --- |
| 3 | 1 | 0 | 638 | 1386 | 100% |
|   | 2 | 0 | 556 |   |   |
|   | 3 | 0 | 192 |   |   |
|   | 4 | 0 | 0 |   |   |
|   | 5 | 0 | 0 |   |   |

Table 4 indicates the equivalent table where the combined nop bit and stop bit encoding scheme discussed above is utilised.

TABLE 4

| Bits | Number of nops in a row | Number of nops after compression | Nops removed from sample code | Total nops removed | Total nops removed percentage |
| --- | --- | --- | --- | --- | --- |
| 1+ overloaded stop bit | 1 | 0 | 638 | 1322 | 95% |
|   | 2 | 0 | 556 |   |   |
|   | 3 | 1 | 128 |   |   |
|   | 4 | 2 | 0 |   |   |
|   | 5 | 2 | 0 |   |   |

Clearly there is a significant advantage to be gained using either a single bit nop, a combination of single bit nop field and stop bit and still further with a multiple bit field for encoding nops. Even a reduction in the number of nop instructions which need to be fully encoded of 75% (number of bits 1 in Table 3) represents a significant reduction in unnecessary code. A simple example of use of the nop bit field is illustrated below. In the following sample sequence of instructions, nop instructions are encoded fully and appear separately in the instruction scheme.

Mul r1=r2, r3;;
Nop;;
Nop;;
Add r1=r1, r5;;

With the new scheme, the code is compacted to:

Mul.nop2 r1=r2, r3;;
Add r1, r5;;

The two nop instructions are simply encoded into the multiply instruction using the combined stop bit and single nop bit field to encode two nops as exemplified in Table 2.

Reverting to FIG. 3, it will be noted that the nop generator 11 examines the encoding of the stop bit and nop bit field of the last syllable in each bundle it receives. When these bits encode a non-zero number of nops then it stores the nop count in its counter 19 as it send the bundle of instructions to the pipeline stage 6 along path 12. On the next cycle, the nop count will be non-zero. When the nop count is non-zero, the nop generator stalls the instruction buffer 10, outputs a nop to the pipeline and decrements the nop count as already discussed.

In this way, the no-operations are introduced into the instruction stream just ahead of the execution stage such that they have the same effect on timing as they would have done if they had been present in the original code.

It will be appreciated that in place of a stop bit field, it would be possible to have a "go" bit field, that is a bit set on each but the last instruction in a bundle.

What is claimed is:

1. A processor for executing instructions comprising:
an instruction decode stage; and
an execution stage, the instruction decode stage comprising means for generating no-operation instructions, wherein the instruction decode stage is operable to supply in a first operational cycle a bundle of operative instructions to the execution stage, each operative instruction in the bundle including a stop-bit field which is set for a last instruction in the bundle, and to supply a number of no-operation instructions in subsequent operational cycles to the execution stage, the number of no-operation instructions to be generated being encoded in no-operation field and the stop-bit field of an operative instruction in the bundle, wherein the execution stage is operable to execute the bundle of operative instructions in parallel.

2. A processor according to claim 1 wherein said generating means comprises means for reading said no-operation bit field.

3. A processor according to claim 2 wherein the no-operation bit field is a single bit.

4. A processor according to claim 2 wherein the no-operation bit field is multiple bits.

5. A processor according to claim 1 wherein the generating means comprises a counter which holds the number of no-operation instructions to be generated and is decremented each time a no-operation instruction is supplied to the execution stage.

6. A method of supplying instructions to an execution stage of a processor wherein at least one operative instruction to be executed by the execution stage encodes a number of no-operation instructions to be executed subsequent to that operative instruction, wherein the method comprises:
decoding each operative instruction;
determining a number of no-operation instructions to be executed after said operative instruction based on a no-operation field and a stop bit of the operative instruction;
supplying, in a first operational cycle, a bundle of operative instructions to the execution stage for execution in parallel, each operative instruction in the bundle including a stop bit which is set to identify the last operative instruction in the bundle; and
where it is determined that at least one no-operation instruction is to be executed, generating said number of no-operation instructions and supplying in subsequent operational cycles said no-operation instructions to the execution stage.

7. A method according to claim 6 wherein said no-operation field is a single bit field.

8. A method according to claim 6 wherein said no-operation field is a multiple bit field.

9. A computer program recorded on a computer readable medium, comprising:
program code means having a sequence of instructions to be executed by a processor, said sequence of instructions including at least some operative instructions which encode a number of no-operation instructions to be executed in a no-operation field and a stop bit field, such that when the program code means is loaded into a suitable processor, a bundle of operative instructions is supplied in a first operational cycle to an execution stage for execution in parallel, wherein each operative instruction in the bundle includes a stop bit field which is set for the last operative instruction in the bundle, and a number of no-operation instructions corresponding to that encoded in the operative instruction is generated and supplied in subsequent operational cycles to the execution stage for execution after the operative instruction has been executed.

10. The computer program of claim 9 wherein said instruction sequence also includes no-operation instructions.

11. A processor, comprising:
an instruction buffer to receive a bundle of instructions, each bundle comprising at least one operative instruction, each operative instruction including a stop field which indicates whether the operative instruction is a last operative instruction in the bundle;
a no-operation instruction generator communicatively coupled to the instruction buffer; and
an execution pipeline stage communicatively coupled to the instruction buffer and the no-operation instruction generator, wherein the processor is configured to:
pass the bundle of instructions from the instruction buffer to the execution pipeline stage for execution in parallel;
determine a number of no-operation instructions to be passed after the bundle of instructions, the number being encoded in a no-operation field and the stop field of an instruction in the bundle of instructions; and
pass the determined number of no-operation instructions from the no-operation instruction generator to the execution pipeline stage after passing the bundle of instructions to the execution pipeline stage.

12. The processor of claim 11, wherein each operative instruction in the bundle includes a no-operation field.

13. The processor of claim 11, wherein the processor is configured to determine the number of no-operation instructions to be passed after the bundle of instructions based on the last operative instruction in the bundle.

14. The processor of claim 13, wherein the stop field comprises a stop-bit and a no-operation bit.

15. The processor of claim 11, wherein the determined number of no-operation instructions is zero.

16. A computer readable medium containing a set of instructions for execution by a processor, the set of instructions comprising bundles of instructions for parallel execution and including at least one operative instruction in each bundle, each operative instruction comprising a stop field containing an indication of whether the instruction is a last operative instruction in a bundle and wherein each bundle of instructions contains an indication of a number of no-operation instructions to be executed after execution of the bundle of instructions encoded in a no-operation field and the stop field in an operative instruction in the bundle.

17. The computer readable medium of claim 16, wherein each operative instruction comprises a no-operation field for storing an indication of a number of no-operation instructions associated with the operative instruction.

18. The computer readable medium of claim 16, wherein the stop field comprises a stop bit and the no-operation field and the stop field of the last instruction in a bundle of instructions contains an indication of a number of no-operation instructions associated with the bundle of instructions.

19. A processor for executing instructions, comprising:
an instruction decode stage having means for generating no-operation instructions; and
an execution stage, wherein the instruction decode stage is operable to supply in a first operational cycle a bundle of operative instructions to the execution stage, and to supply a number of no-operation instructions in subsequent operational cycles to the execution stage, each operative instruction in the bundle including a stop bit field which is set for the last operative instruction in the bundle, the number of no-operation instructions to be generated being encoded in a no-operation bit field and a stop bit field in an operative instruction in the bundle, wherein the execution stage is configured to execute the bundle of operative instructions in parallel.

20. The processor according to claim 19 wherein the generating means comprises a counter which holds the number of no-operation instructions to be generated and is decremented each time a no-operation instruction is supplied to the execution stage.

21. The processor according to claim 19 wherein the generating means comprises means for reading said no-operation bit field and said stop bit field in said operative instruction in the bundle.

22. A method of supplying operative instructions to an execution stage of a processor wherein at least some of the operative instructions to be executed by the execution stage encode a number of no-operation instructions to be executed subsequent to the operative instruction, the number of no-operation instructions to be executed being encoded in a no-operation bit field and a stop bit field in an operative instruction, the method comprising:

decoding each operative instruction;

reading said no-operation bit field and said stop bit field to determine the number of no-operation instructions to be executed after said operative instruction;

supplying in a first operational cycle a bundle of operative instructions to the execution stage for execution in parallel, each operative instruction in the bundle including a stop bit field which is set for the last operative instruction in the bundle; and when it is determined that at least one no-operation instruction is to be executed, generating said number of no-operation instructions; and supplying in subsequent operational cycles said no-operation instructions to the execution stage.

23. A method according to claim 22 wherein said no-operation bit field is a single bit field.

24. A method according to claim 22 wherein said no-operation bit field is a multiple bit field.

25. A computer program recorded on a computer readable medium comprising:

program code means having a sequence of instructions to be executed by a processor, said sequence of instructions including at least some operative instructions which encode a number of no-operation instructions to be executed, the number of no-operation instructions to be executed being encoded in a no-operation bit field and a stop-bit field in an operative instruction such that when the program code means is loaded into a suitable processor, a bundle of operative instructions is supplied in a first operational cycle to an execution stage for execution in parallel, wherein each operative instruction in the bundle includes a stop bit field which is set for the last operative instruction in the bundle, and a number of no-operation instructions corresponding to that encoded in the operative instruction is generated and supplied in subsequent operational cycles to the execution stage for execution after the operative instruction has been executed.

26. The computer program of claim 25 wherein said instruction sequence also includes no-operation instructions.

* * * * *